United States Patent [19]

Stephens et al.

[11] Patent Number: 5,237,159
[45] Date of Patent: Aug. 17, 1993

[54] ELECTRONIC CHECK PRESENTMENT SYSTEM

[75] Inventors: Thomas S. Stephens, Addison, Tex.; George B. Anderson, Freehold, N.J.; Daniel R. Mills, Los Angeles, Calif.; Richard A. Sherman, Marlboro, N.J.; Harry B. Drollinger, McKinney, Tex.

[73] Assignee: J. D. Carreker and Associates, Dallas, Tex.

[21] Appl. No.: 731,529

[22] Filed: Jul. 17, 1991

[51] Int. Cl.5 ............................................. G06F 15/30
[52] U.S. Cl. ................................. 235/379; 364/406; 364/408
[58] Field of Search ................ 364/401, 406, 408; 235/379

[56] References Cited

U.S. PATENT DOCUMENTS

| | | | |
|---|---|---|---|
| 4,264,808 | 4/1981 | Owens et al. | 235/379 |
| 4,270,042 | 5/1981 | Case | 235/379 |
| 4,523,330 | 6/1985 | Cain | 235/379 |
| 4,694,397 | 9/1987 | Grant et al. | 364/408 |
| 4,823,264 | 4/1989 | Deming | 364/408 |
| 5,038,283 | 8/1991 | Caveney | 364/401 |

FOREIGN PATENT DOCUMENTS 164368 10/1982 Japan .................................. 364/408

OTHER PUBLICATIONS

UNISYS, Brochure, 2 pages describing "V Series Item Processing System Tape Input/Output Module."

Primary Examiner—John W. Shepperd
Attorney, Agent, or Firm—Hubbard, Thurman, Tucker & Harris

[57] ABSTRACT

An Electronic Check Presentment System provides a bank with a fully automated capability for participating in the electronic exchange of check data. It allows banks that utilize the system to take MICR data that has been obtained through check capture methods, selectively extract particular check records and place them in the form of electronic cash letters, transfer the electronic cash letters to selected banks, receive electronic cash letters from other banks, reconcile the electronic cash letters against the paper cash letters when they arrive, and input the electronic MICR data into a database responsible for maintaining check records.

46 Claims, 10 Drawing Sheets

Microfiche Appendix Included
(10 Microfiche, 46 Pages)

ELECTRONIC CHECK PRESENTMENT SYSTEM

REFERENCE TO MICROFICHE APPENDIX

A microfiche appendix containing a computer program listing was submitted with this patent document.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsoever.

TECHNICAL FIELD OF THE INVENTION

This invention relates to the field of electronic check processing, and more specifically, to a data processing methodology and apparatus that allows all banks that utilize this invention to electronically transfer and receive check information.

BACKGROUND OF THE INVENTION

For some time, banking institutions have handled the presentment of checks for payment in a manual fashion. At a specified time each day, a bank sorts all checks presented to it into bundles, with the bundles pertaining to particular banks on which they are drawn (the "drawee bank"). As the checks are sorted for particular destination banks, they are gathered into batches of about 300 checks. One or more of these batches are than aggregated for shipment to the destination or "payor" bank. A cover letter is attached to each shipment of checks that summarizes the contents of the shipment. Such summary information comprises the name of the payor bank, a number associated with the name of the drawer bank (called the routing transit number), the number of checks in the shipment and the total dollar amount of all of the checks in the batch. The cover letter is termed a Cash Letter. The presenting bank then transfers to the payor bank the "Cash Letter", which includes the cover letter and the bundle of checks.

When the drawee bank receives the Cash Letter, it verifies that the contents of the cash letter, i.e., the checks, agree with the totals contained on the cover letter. The bank also determines whether enough money exists in the payor customer's account to cover payment of the check, and either accepts or rejects payment of the check. The payor bank then notifies the presenting bank regarding any balancing discrepancies or any items which are to be returned.

The above procedure is an over-simplification of the process established for clearing checks between banks. However, it is sufficient to demonstrate the problems associated with such a process. A first problem resulting from the above process is the delay between the time a check is first deposited at the presenting bank and the time the drawee bank accepts or rejects the check. The payor bank has the choice of either placing a hold on the depositing customer's bank account until it is notified of acceptance by the payor bank, or it pays out the money to the presenter and incur the risk that the check will be rejected by the drawee bank.

Many banks choose not to incur such a risk, and therefore place a hold on the presenter's bank account until it is notified that the check has been accepted. However, the time that it takes for the payor bank to be notified that a check has been accepted or rejected may take as long as 7 to 10 days. The Expedited Funds Availability Act of 1987, however, places limits on the length of time that a bank may retain a hold on a customer's funds. In most cases, only two days are allowed for local items, and only three days for non-local items. These time limits can severely expose a bank to risks of loss and fraud by forcing a bank accepting customers deposits to release funds to that customer prior to verification that those funds are, in fact, collectable from the payor institution.

To overcome the problem of delay, banks have attempted to automate the process of gathering checks into cash letters, sending and receiving cash letters, and reconciling these cash letters against their contents. Such attempts at automation have included the installation of check sorter machines that scan checks at very high speeds, and sort these checks into bundles associated with payor banks. The sorter "reads" information contained on the checks such as the routing transit number, the drawer's account number, the check number and the amount of the check. This information is stored in a line of symbols at the bottom of each check in MICR (Magnetic Ink Character Recognition) form. Check sorter machines have been used quite successfully and are well known in the art.

Another attempt at automating the check process is the use of computer systems to record and manage the information associated with the check sorting procedure. Such computer systems interface with the check sorter machines and allow the computer systems to build database information associated with each check that is read. This allows an operator of a computer system to obtain information on checks that have been read such as the total number of checks drawn on specific banks and the total dollars of all checks drawn on specific banks. One such system that accomplishes this task is the IBM CPCS (Check Processing Control System).

Although both of the above attempts have benefitted the banking industry, they have failed to address the problem of delay associated with the transfer of cash letters between banks. Better transportation, overnight express, and other services have helped to improve the transfer of cash letters, but the transfer of the information contained in the cash letters has still been dependent on the physical delivery of the cash letters to the drawee bank. Such dependence on the physical transfer of the cash letters perpetuates the delay associated with acceptance or rejection of particular checks.

Another problem associated with the transfer of cash letters between banks is the inability of either bank to specify, for identification purposes, a particular check that was sorted by the other banks system. As each check is captured on the check sorting machines, a micro-film image is captured, and a unique "item sequence number" is assigned by the CPCS system. The system then maintains a database of item sequence numbers so that it can later identify and find individual checks within the numerous rolls of micro-film. However, since each bank assigns its own item sequence numbers, there is currently no way for one bank to cross reference its own item sequence number to that of another bank.

Although means have come into existence that allow for wire transfer, or electronic transfer of funds from banks, see Deming, U.S. Pat. No. 4,823,264 and Case, U.S. Pat. No. 4,270,042, these systems have dealt with transfer of funds between a bank and an individual user.

No system to date has allowed banking systems to electronically transfer, and control the transfer of, the large volume of checks deposited in their institutions every day.

SUMMARY OF THE INVENTION

It is therefore an object of this invention to provide a way for banks to electronically transfer cash letters and improve the delay resulting from physical transfer.

An additional objective of this invention is to provide banks with a method for minimizing its risk of exposure to check loss and check fraud due to the legal limits placed upon banks for placing a hold on the funds of their customers.

Another object of this invention is to allow a bank that utilizes electronic check presentment to reconcile the received electronic cash letters against the physical paper cash letters when they arrive.

A further object of this invention is to allow both the depositing bank and the paying bank to re-associate the item sequence numbers assigned by both banks, and by the electronic check presentment system, to allow for easy cross-referencing.

An additional object of this invention is to provide for electronic check presentment without changing the existing methodology associated with paper check presentment.

A further object of this invention is to utilize existing check databases and check sorting machines in the electronic check presentment process so as to minimize the impact on present check presentment procedures.

The Electronic Check Presentment System provides a bank with a fully automated capability for participating in the electronic exchange of check data. It allows banks that utilize the system to take MICR data that has been obtained through check capture methods, selectively extract particular check records and place them in the form of electronic cash letters, transfer the electronic cash letters to selected banks via existing computer-to-computer data transfer technology, to receive electronic cash letters from other banks, reconcile the electronic cash letters against the paper cash letters when the physical paper items arrive, and input the electronic MICR data into a database responsible for maintaining check records.

The Electronic Check Presentment System uses electronics to move check information efficiently between presenting and paying banks, and improves the collection and return processes by the amount of time required for transportation of the checks between banks and by allowing banks to debit customer accounts from electronically received items. Depositing banks begin the funds collection process by transmitting MICR line information while continuing the presentment of the physical checks via ground and air transportation. Checks deposited on a Monday can be presented electronically to the paying bank anywhere in the country that same evening. Because electronic check presentment can be completed faster than physical check presentment, the check presentment process can be accelerated by at least one day.

To this end, the applicant has initiated the formation of ECCHO (Electronic Check Clearing House Organization) as a cooperative venture to implement electronic check presentment. The organization has designed a standard ECCHO format that mirrors a paper cash letter with detail records (checks) and summary records (batches and cash letters). When the presenting bank produces a paper cash letter, it also creates an electronic cash letter from its existing check capture files to send to the paying banks. After the paying bank receives and captures the paper checks, it then reconciles the paper checks with the electronic items.

DETAILED DESCRIPTION OF THE DRAWINGS

Figure 1:
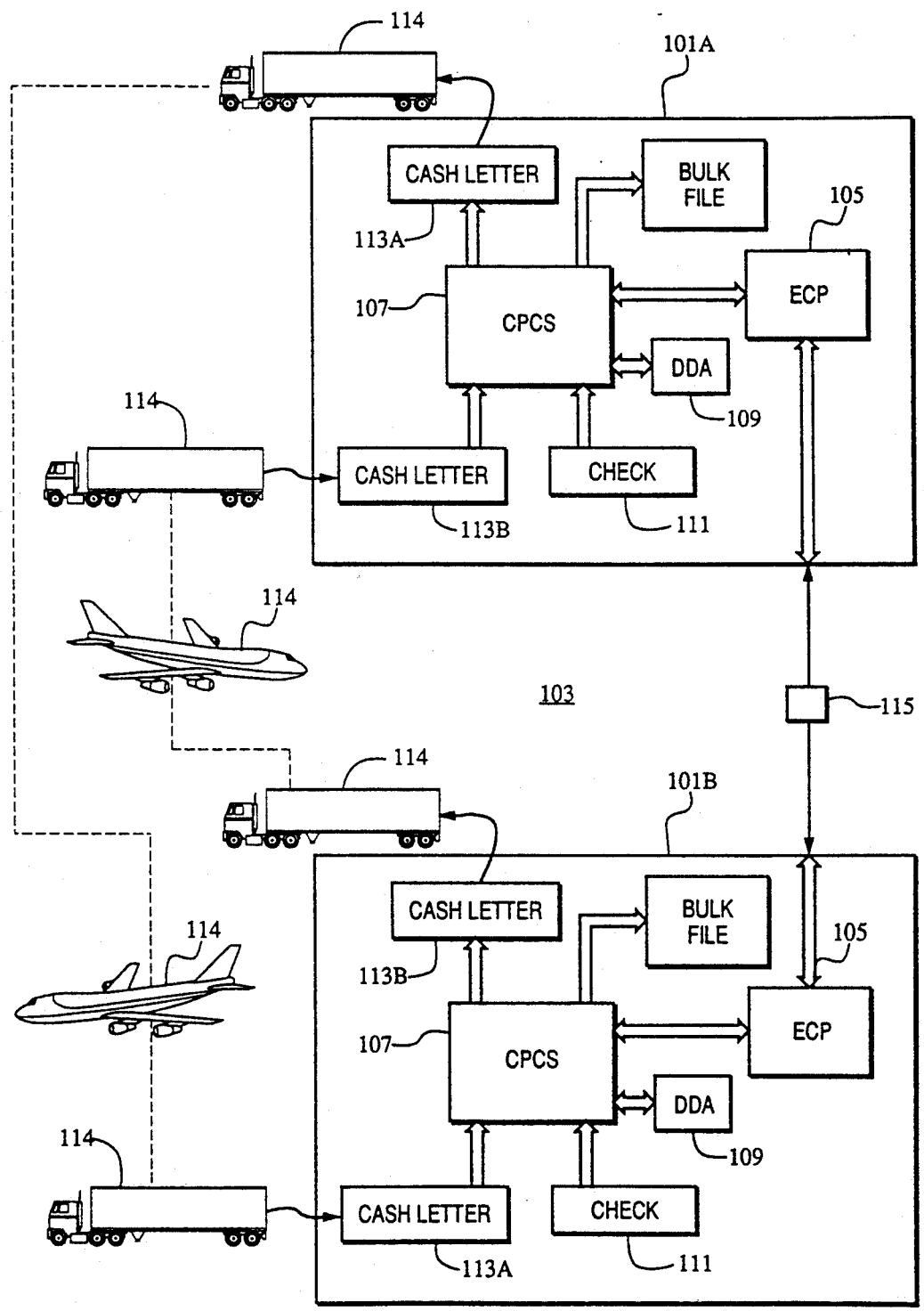
FIG. 1 is a schematic representation of an electronic check presentment system.

Referring to FIG. 1, partner banks 101 are members of an electronic check clearing house organization (ECCHO) 103. There is no limit on the number of banks that may participate in the ECCHO. Typically, each partner bank in the ECCHO has a check capture system 107, such as the industry standard Check Processing Control System (CPCS) of International Business Machines Corporation, and a demand deposit accounting (DDA) system 109. Both are data processing systems having various configurations well known in the art. Additionally, when participating in the ECCHO, each bank has an Electronic Check Presentment (ECP) System 105 that is coupled to the CPCS. The ECP system may run on the same data processing equipment or computer system as the CPCS or DDA. The CPCS, DDA and ECP systems are used as follows in an electronic presentment system.

Partner banks 101A and 101B receive paper checks 111, usually deposited by their respective customers. After their deposit, the checks are "captured" by the CPCS, usually after the close of business on the day they are received. The capture process begins by passing the checks through check sorting machines (not shown). The sorters read characters on each paper check that are printed with magnetic ink and are provided to a magnetic ink character recognition (MICR) system for conversion to data that is stored in a CPCS mass data storage file, or MDS (not shown). The printed characters are sometimes collectively referred to as the MICR line, and the complete set of MICR-line data is sometimes called a check "image", as it contains most of the pertinent data on the check. The records in the CPCS MDS include fields for the routing/transit code for the payor bank (the bank on which the check is drawn), the account number of the customer who wrote the check, the serial number of the check and its amount. Based on the routing/transit number on the check, the CPCS directs the sorter to pocket the check for the bank on which it is drawn.

At various times throughout each business day, the CPCS generates a cash letter for each bank for which there are checks. The checks that are pocketed for each bank are then bundled with the respective cash letter. Collectively the checks and the letter are simply referred to as a cash letter 113. Assuming both banks 101A and 101B have checks drawn on the other bank, banks 101A and 101B deliver cash letters 113A and 113B, respectively, to the other bank via a courier 114 service that physically transports the bundle to the respective bank.

Once the cash letter has been produced, the ECP system at each bank prepares, using the same MICR-line data stored in the CPCS MDS data file, electronic cash letters for each "paper" cash letter 113A and 113B that is sent. This electronic cash letter is then sent to the respective banks, using standard communication techniques over one or more electronic or optical data transmission networks 115.

Once received, the electronic cash letters are processed the same day by the receiving bank's ECP system 105 and CPCS 107. Generally, this involves having the ECP systems first perform certain preprocessing functions, then presenting this electronic cash letter containing the MICR information to the CPCS. The CPCS then "captures" the items or checks in the electronic cash letter as if they were physical paper items, and sends some or all of these items to the bank's posting systems, such as Demand Deposits (DDA), and etc. This called a "non-MICR" capture, as the information is not being read by the CPCS from the magnetic ink characters on the paper checks, but from a "non-MICR" file created by the ECP.

The couriers 114 usually deliver the paper cash letters 113A and 113B to the banks the next business day. Upon arrival, the paper checks are placed in the CPCS sorters at the receiving banks for capture by the CPCS system 107. After capture, the ECP system reconciles the electronic and the paper cash letters with the MICR line data. The checks are then handled in the usual manner by the banks.

The forgoing is a general description of the functioning of a basic ECCHO exchange. FIGS. 2–8 illustrate details of the ECP system. Basically, it has two major sub-systems: 1) the Send System; and 2) the Receive System. An additional but critical component of the ECP system is an on-line CIF system, that is common to both the Send and the Receive subsystems, and will be first discussed without reference to a figure. In the preferred embodiment, the ECP is implemented with a general purpose digital computer whose operation is directed by a program such as the one disclosed in the microfiche appendix submitted herewith.

The On-Line CIF System

The On-Line CIF System handles, among other things, on-line maintenance of partner bank records, benefit sharing percentages, and edit rules. It also provides a complete data base file list and audit control reporting.

The majority of all benefits derived from the ECP process accrue to the bank receiving the electronic Cash Letter. ECCHO Rules permit each Receiving bank to negotiate benefit sharing arrangements independently with each prospective exchange partner, to provide an incentive to the partner for sending electronic Cash Letters to that bank. A key element of the system, then, is the centralized storage of each of these agreements within a single data base file.

Additional data stored in the CIF system include fields of a general nature that identify the name of the partner banks, the primary contacts at the partner banks (for both sending and receiving data) and the telephone number(s) for the primary contacts. Data fields that are more specific are defined to include identification numbers for the partner banks, such as routing/transit numbers, version numbers of the ECCHO record formats to be sent to and received from the partner banks, send and receive cut-off times that define the target deadlines for the partner banks, send and receive volume cut-offs that identify the maximum number of items allowed for each banks transmission, and send and receive cash letter maximums that define the maximum number of cash letters allowed for transmission to and receipt from each partner bank.

The CIF system also includes fields that pertain to profit/benefit sharing for each of the partner banks. These fields store the benefit percentages to be applied to the electronic cash letters that are sent to or received from the partner banks for each day of the week. Finally, the CIF system includes fields that are used to maintain information relating to the partner bank's records such as the date and time associated with the last update of the records, as well as identification of the user responsible for the last update.

The maintenance portion of the CIF System comprises modules for adding, updating and deleting partner bank CIF records. The Add function allows an authorized user to input all partner bank data as detailed in the section discussed above. The system contains logical edits that prevent a user from entering duplicate records (based on record type and bank-id fields). In addition, the system will not allow for sending data to, or receiving data from, partners with whom such exchanges have not been authorized in the CIF. This is determined by the ECCHO record version number. To ease the entry of information into the Add screen, the CIF System automatically inserts the current date, time and operator id into each new record.

The Edit/Update portion of the CIF System prompts the user to enter the bank identification number for the requested record. The system then displays an edit screen, similar to the Add screen, that contains the data for the requested bank. The system allows an authorized user to modify all fields within the screen except the record type, bank-id and last update fields. In addition, the Edit/Update portion of the CIF System provides the same logical edits and automatic entries that are available in the Add portion.

The Delete/Undelete portion of the CIF System allows an authorized user to mark a bank record as deleted as of a specified date. The Delete/Undelete portion prompts the user to enter the bank-id number for the requested record. It then displays a screen, similar to the Add screen, containing information for the particular bank requested. The Delete/Undelete portion allows the user to close the account by entering an account closed date into the system. If, at a later time, the user wishes to re-open an account, he can do so by entering zeroes in the account closed date field.

The CIF System also includes audit reporting features that detail the changes made to the CIF database, whether through Adds, Edits or Deletes. The System prompts the user to enter the start date for the report, with the end date of the report being the current system date. The CIF system scans the CIF database and selects only those records that fall within the date range specified by the user. The system then formats and prints a list of all data fields along with the corresponding changes to the data fields. In addition to these features, the CIF System includes the ability to print out a detail listing of all partner bank records currently on the CIF database.

The Send System

Figure 2:
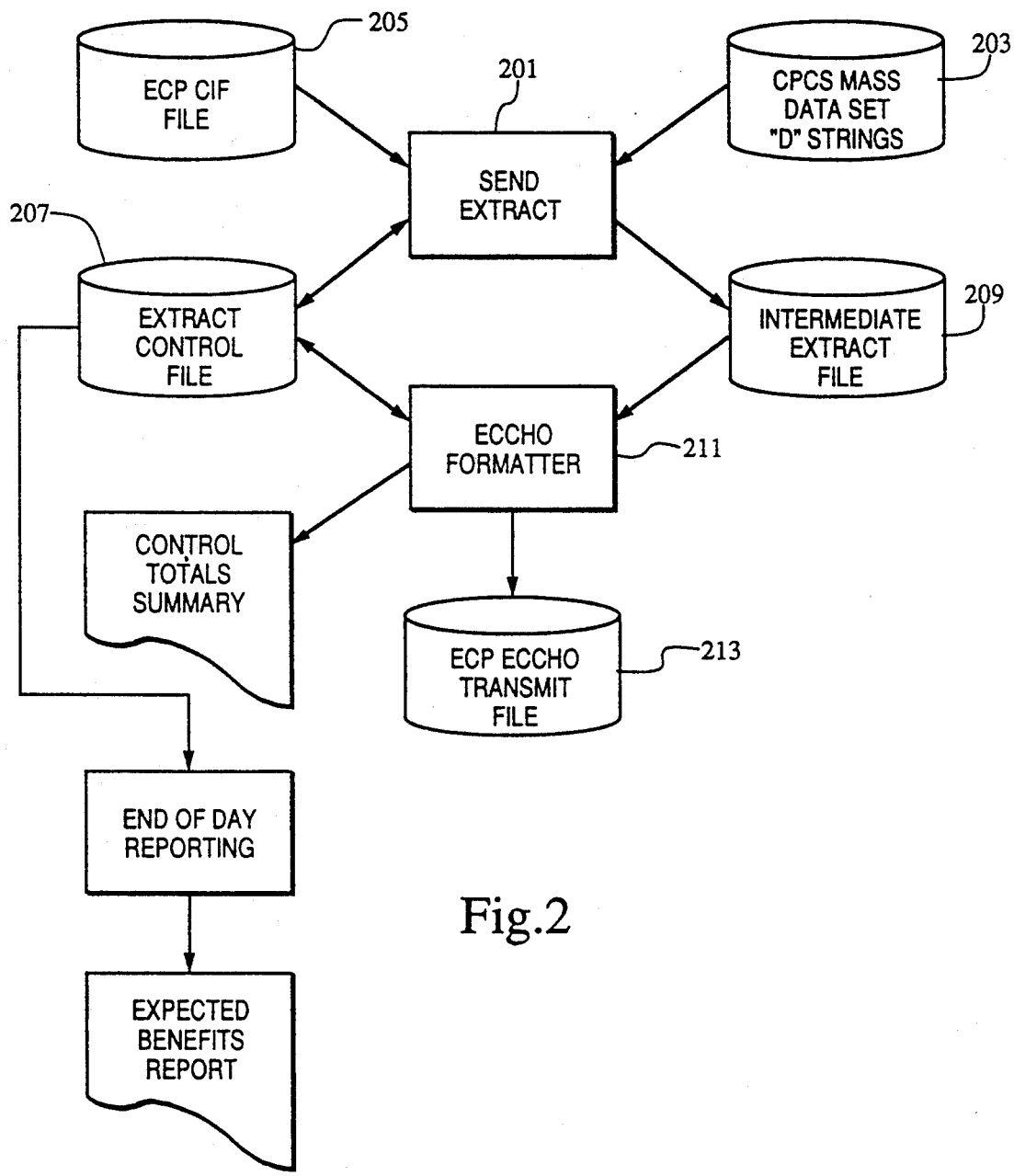
FIG. 2 is a schematic representation of a send sub-system for the electronic check presentment system.
Figure 3:
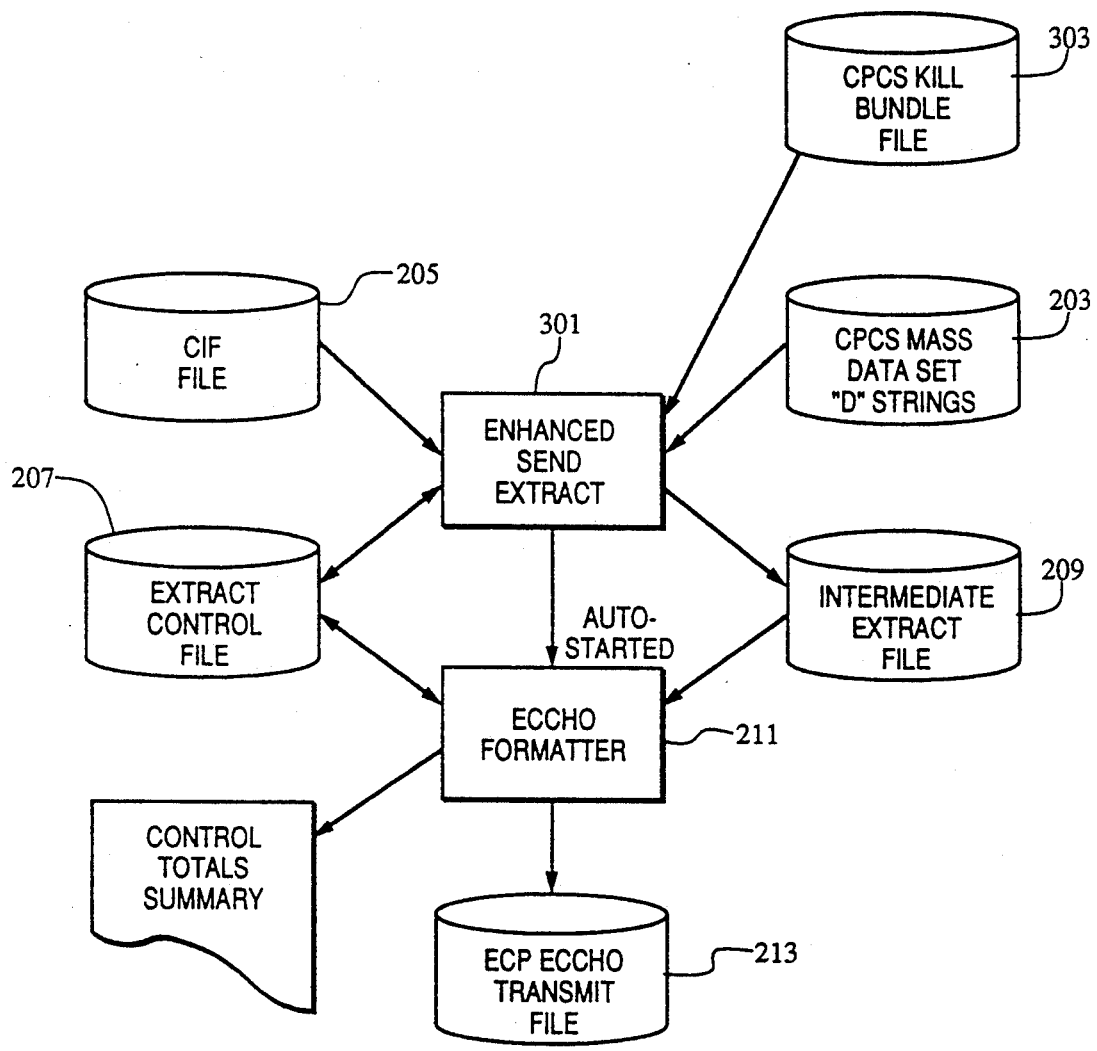
FIG. 3 is a schematic representation of an alternate embodiment of the send sub-system.

Referring now briefly to FIGS. 2 and 3, the Send portion of the Electronic Check Presentment System automatically handles the selection and extraction of targeted cash letters from the CPCS system. The Send portion may be divided into two different segments that address the diverse requirements of the marketplace: a Basic Send segment, which is Cycle and String based, shown in FIG. 2; and an Enhanced Send segment, which is Cash Letter and Kill Bundle-based, shown in FIG. 3.

Referring now to just FIG. 2, the Basic Send segment provides on-line capability for initiating the creation, or re-creation, of an electronic cash letter file. The cash letter file is, in essence, a sequential file suitable for transmission to partner banks. The Basic Send segment includes an extract module 201. The cash letter extract module 201 segment allows the user to select a specific destination bank, called an end point, extract all items associated with this end point, and create an electronic file of this data for conversion into a standard format. The user is first prompted to enter the specific cycle to be extracted from all cycles in the CPCS Mass Data Set 203. The extract module utilizes the bank records, discussed in the CIF System above, to dynamically build and display a screen containing all the bank names on file. The user can then select a particular bank or end point for extraction. The cash letter extract module then extracts all item records from the CPCS Mass Data Set that correspond to the selected end point and cycle requested. Upon extraction, the module builds an intermediate extract file 209 that will be used by the ECCHO format module 211. After building the intermediate file, the extract module 201 formats and prints a paper detail report of all extracted items, and writes a summary record to an extract control file 207 containing the extracted end point and summary totals at the bundle level of all cash letters extracted for electronic transmission. The extract control file provides data for end of the day reporting, including an expected benefits report.

The ECCHO formatting module 211 is automatically started from the cash letter extract module after the extract module builds the intermediate file. The module looks at the bank records in the CIF System to determine the proper ECCHO record version number currently in use by the specific end point bank for which the extraction was done. It then builds an electronic cash letter file, termed an ECCHO transmit file 213.

The electronic cash letter file in ECCHO format comprises check detail records, file, cash letter and batch headers, and file, cash letter and batch trailers. The check detail records include fields for the paying banks routing transit number, the payor's account number, the amount of the check, the item sequence number assigned by the sending bank, and status fields that determine whether the sending bank anticipates benefit sharing, and whether the check being transmitted is for collection, return or return notice. The check detail record also includes fields for storing the depositor's account number, the originating banks routing transit number, the date and time the cash letter was created, and the cash letter number.

A file header exists for each electronic cash letter file. The file header includes the ECCHO format version number for the receiving bank, the routing transit number of the presenting bank, the date and time the file was created, and the name of the presenting bank. A file trailer also exists for each electronic cash letter file. This trailer includes the total dollar amount of all check records in the file, the total number of cash letters in the file, and the total dollar amount of all benefit sharing records in the file.

The electronic cash letter file also contains a cash letter header for each cash letter extracted. This header includes the routing transit numbers of both the origination bank and the destination bank, the date and time the cash letter was created, the date the electronic cash letter file was created, the cash letter number, and the name of the originating bank. A cash letter trailer also exists for each cash letter in the file. This trailer includes some of the information contained in the cash letter header, as well as the total dollar amount of the cash letter.

A third header in the electronic cash letter is the batch header. A batch header exists for each batch that was extracted from the CPCS Mass Data Set. The batch header includes the routing transit numbers of both the origination and destination banks, the date the batch was processed, the bundle ID, the bundle number, and the cycle number. A batch trailer record is also created for each batch extracted in the electronic cash letter. The batch trailer includes the total number of all check records in the batch, the total dollar amount of all check records in the batch, and the total dollar amount of all benefit sharing check records in the batch.

In addition to the cash letter extract module, the Basic send segment of the Send System also includes an extract re-run module (not shown). This module allows the user to re-create a file that has been previously extracted. Upon completing the extraction, this module compares the results of the extraction with those of the previous extraction. If the module detects a change in the information obtained through the extraction, it will notify the user that a particular data file, or string, is missing and will identify the missing string name, bundle number, bundle amount and item count.

The basic send segment also contains an extract re-start module that allows the user to re-start an extract job that failed due to a program or system problem. Upon execution by the user, the module creates a completely new extract file for the requested end point.

In addition to the above modules, the Basic send segment includes a number of utilities that enhance the Send System. One of the utilities, end of day reporting module 215, allows the user to request the printing of a summary level report of all electronic cash letters sent out for a specific day, along with a the corresponding expected benefits report 217. A second utility allows the user to delete an entire entry from a previous extract file.

Referring now to FIG. 3, the Enhanced Send segment of the Send portion of the Electronic Check Presentment System extends the functionality of the Basic Send segment to include the capability of extracting at the cash letter bundle level and ensures that the paper cash Letter and the electronic cash letter are exact duplications of one another. The enhanced send segment includes modules and files that are functionally similar to those of the basic send system: CIF file 205; CPCS Mass Data Set file 203; extract control file 207; intermediate extract file 209; ECCHO formatter 211; and ECCHO transmit file 213.

An enhanced cash letter extract module 301 allows a user to select a specific bank and a specific cash letter time, and extract all killed items for this cash letter. The extract module functions similarly to the one in the basic send segment except that, after the user has selected a bank to be extracted, the user is prompted to enter the cash letter time which will identify the kill bundles to be extracted. The module will then read the CPCS kill bundle file 303 to select records which match the requested cash letter time. The selected records provide pointers into the CPCS Mass Data Set Strings, which are used to extract all item records for the corresponding kill bundle. The module then creates an intermediate extract file 209, which is processed through the ECCHO formatter 211 module as in the basic send segment.

The enhanced send segment includes a utility that allows the user to generate an end of day benefits summary report which is a summary level report of all electronic cash letters sent out for a specific day along with the corresponding expected benefit amounts. This utility prompts the user to enter the requested cycle for the report then extracts the data for the requested cycle and formats the information for printing.

The Receive System

Referring briefly to FIGS. 4A-8, a Receive System verifies, processes, and monitors the receipt of electronic cash letters from partner banks. It handles the automated entry of non-MICR data into CPCS and the follow-up reconciliation of the electronically captured items to the actual physical paper items. The Receive System comprises five modules: an input file preprocessor; a CPCS non-MICR input processing module; a reconciliation module, an image match/directed fine sort module; and an end of day reporting module.

Figure 4A:
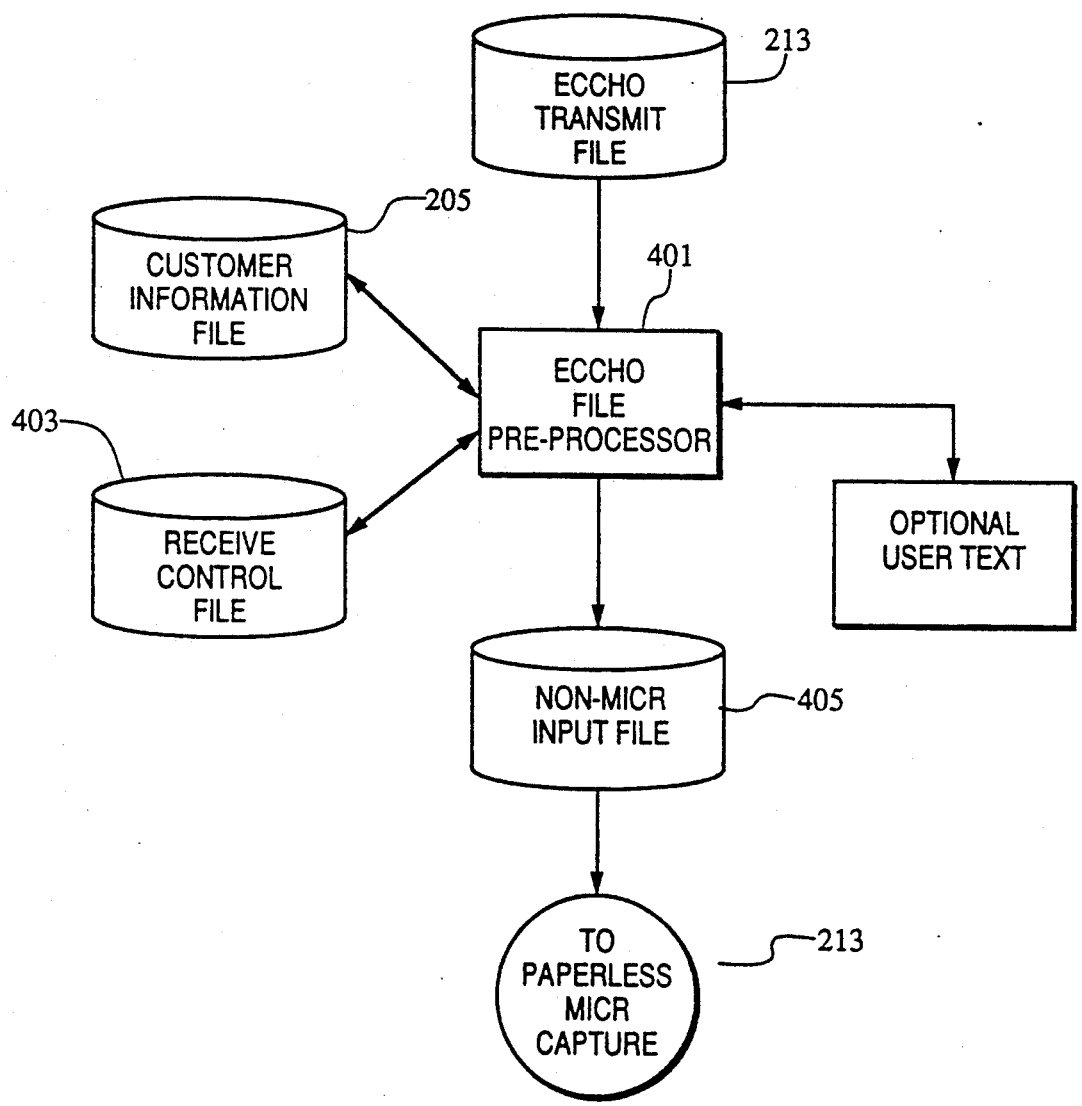
FIG. 4A is a schematic block representation of a preprocessor for operation in a receive subsystem of the electronic check presentment system.

Referring now to FIG. 4A, the input pre-processor module is a batch process that is either manually started, or auto-started from the transmission receive job. Its function is to balance and pre-edit an incoming ECCHO transmit or electronic cash letter file 213 from other partner banks.

The pre-processor module 401 reads the presenting banks routing transit number contained in the file header record of the electronic cash letter file and validates this number against the routing transit numbers contained in the receiving banks CIF file 205. The validation determines whether the sending bank is a valid sending partner, and whether a send agreement between the two is currently in force. If the sending bank is validated in both of these respects, the pre-processor continues to process the electronic cash letter file.

Upon receipt and validation of each electronic cash letter file, a record for each file is created in a receive control file 403. The record comprises data associated with the electronic cash letter file such as the name of the file, the date and time the file was created, the total number of entries in the file, and other information pertaining to file, bundle and cash letter totals. This information is updated as pre-processing of the electronic cash letter file continues.

The electronic cash letter file is then checked for duplicates, at the file level, the cash letter level, and the bundle level by searching the records in the receive control file for matching creation dates and times, matching cash letter numbers and matching kill bundle identification codes and kill bundle numbers. If any duplicate cash letters exist, they are bypassed during processing.

After checking for duplication, the pre-processor 401 balances the electronic cash letter file at the bundle level, the cash letter level and the file level. For balancing at the bundle level, the total number of all check records in the batch are balanced against the check record count extracted from the batch trailer. The total dollar amounts of all check records and all benefit sharing check records in the batch are also balanced against the check record count extracted from the batch trailer.

The file is balanced at the cash letter level by comparing the total number of batch check records, the total dollar amount of all check records, and the total dollar amount of all benefit sharing records, that are extracted from the cash letter trailer with those amounts calculated by the pre-processor upon examination of the individual check images.

The pre-processor balances the electronic cash letter file at the file level by comparing the total dollar amount of all cash letters and the total number of cash letters in the file with the associated information contained in the file trailer. The pre-processor then prints a balancing report that lists, by cash letter, all out of balance batches, cash letters and/or files.

The pre-processor will then reformat the incoming file into a CPCS MICR format file termed a "non-MICR" file 405 to differentiate from a MICR file that is created from capturing of paper checks. This non-MICR file includes fields that specify cycle codes, post-/no-post codes and pocket codes. If then prints a block building report that assists the data prep/block building clerk in assembling the physical paper batches in the proper order for subsequent capture of the paper items.

Figure 4B:
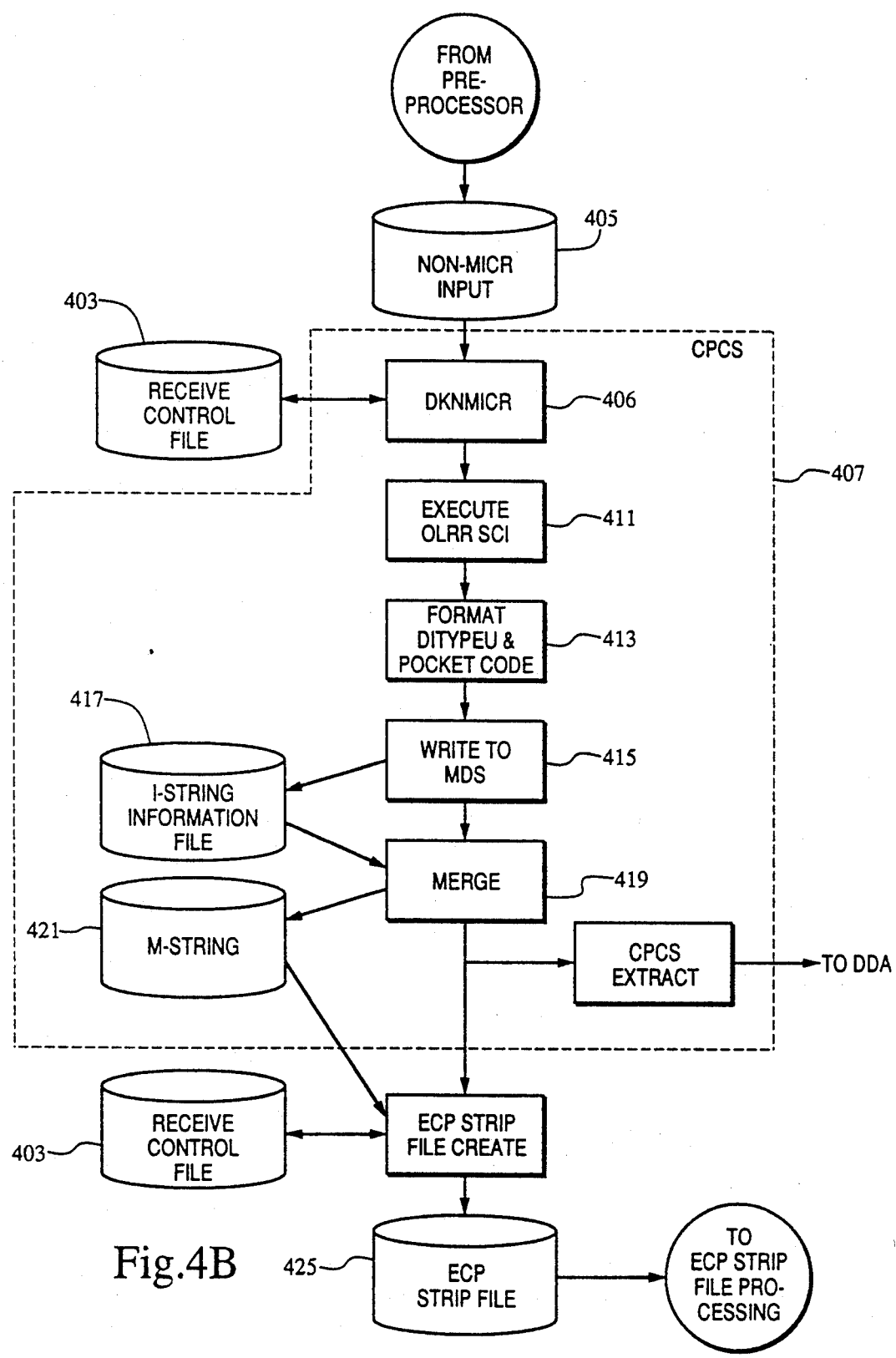
FIG. 4B is a schematic block representation of paperless MICR capture operation in the receive sub-system; the paper-less MICR capture process will allow the CPCS to process electronically received items as if they were physical paper.

Referring now to FIG. 4B, after pre-processing, the non-MICR input file 405 provided to the CPCS for a process termed paper-less MICR capture. To perform this process, a preexisting CPCS system is modified so that it is "tricked" into thinking that the items presented by electronic cash letter are paper items. The CPCS captures and processes electronic cash letters as if they were normal paper cash letters, and all captured electronic items are assigned a second item sequence number by the CPCS.

Illustrated are standard CPCS modules 407, each of which having processes well known in the art. Very briefly, the DKNMICR modules 409 includes all of the modules for interfacing with sorters for MICR capture and sorting. The OLRR SCI module 411 "edits" or checks the MICR line data for each item provided by the DKNMICR modules for validity (e.g. the routing/transit number and account number). Module 413 formats the MICR data for the item and assigns the item a pocket code for DDA or other posting system processing. This MICR data and the pocket code are written to an "all-items" I-String Information file 417, which is a mass data storage (MDS) file, in step 415. At merge step 419, the I-String Information file is converted to an M-String data file 421, by, in essence, stripping all control documents from the file. The CPCS extract module 423 then extracts the data necessary for posting to DDA or other posting systems.

For working with the ECP system, only the DKNMICR module 409 of the CPCS is substantially modified. One modification allows a Station Control Block to be defined for an electronic cash letter sorter. The function indicates that an electronic cash letter sorter has been defined so that the CPCS system can generate the necessary control blocks for the electronic cash letter. Another modification adds references to the electronic cash letter extensions for the station control block and the MICR control table. The CPCS program is also modified to look for a run started on an electronic cash letter sorter. Upon detection, it passes control to the new electronic cash letter initialization module that loads the OLRR edits and retrieves a tracer number from the receive control file 417. When the electronic cash letter sorter run has been initialized, MICR task processing continues as if processing a normal paper run.

Receive control file 417 is updated with balance summaries of the items processed from the electronic cash letter during the run by the DKNMICR modules 409 for cash letter balance control.

Upon completion of the non-MICR processing run, an ECP strip file 425 is created by an ECP strip file processing module 427. This module creates a flat file of the non-MICR input items in I-string sequence and DIIMAGE format. The strip file creation module also creates a balance summary of the items entered in the ECP strip file 425 for error checking against the summary in receive control file 417.

Figure 4C:
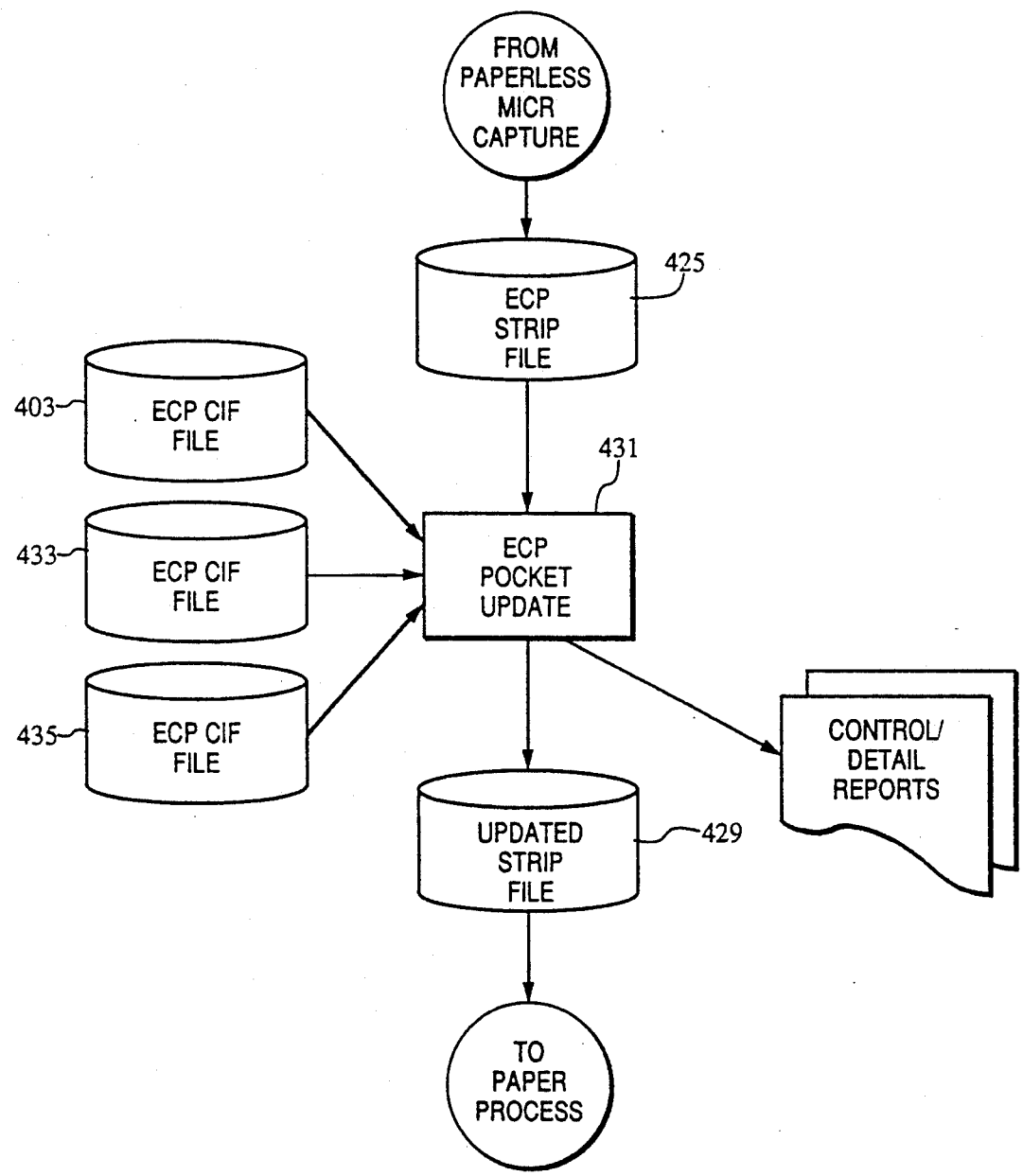
FIG. 4C is a schematic block representation of ECP strip file warehouse process in a receive sub-system.

Referring now to FIG. 4C, on the next day (day 2), the ECP strip file must be updated with information about whether there were items excepted in the DDA the night before and not posted, as well as the proper cycle information for each item that was posted. To create an updated ECP strip file 429, a pocket update module 431 in the ECP system matches each item in the EPC strip file 425 with corresponding DDA cycle for the item in DDA cycle file 433 and with any exceptions for the item in DDA exceptions file 435.

Figure 5:
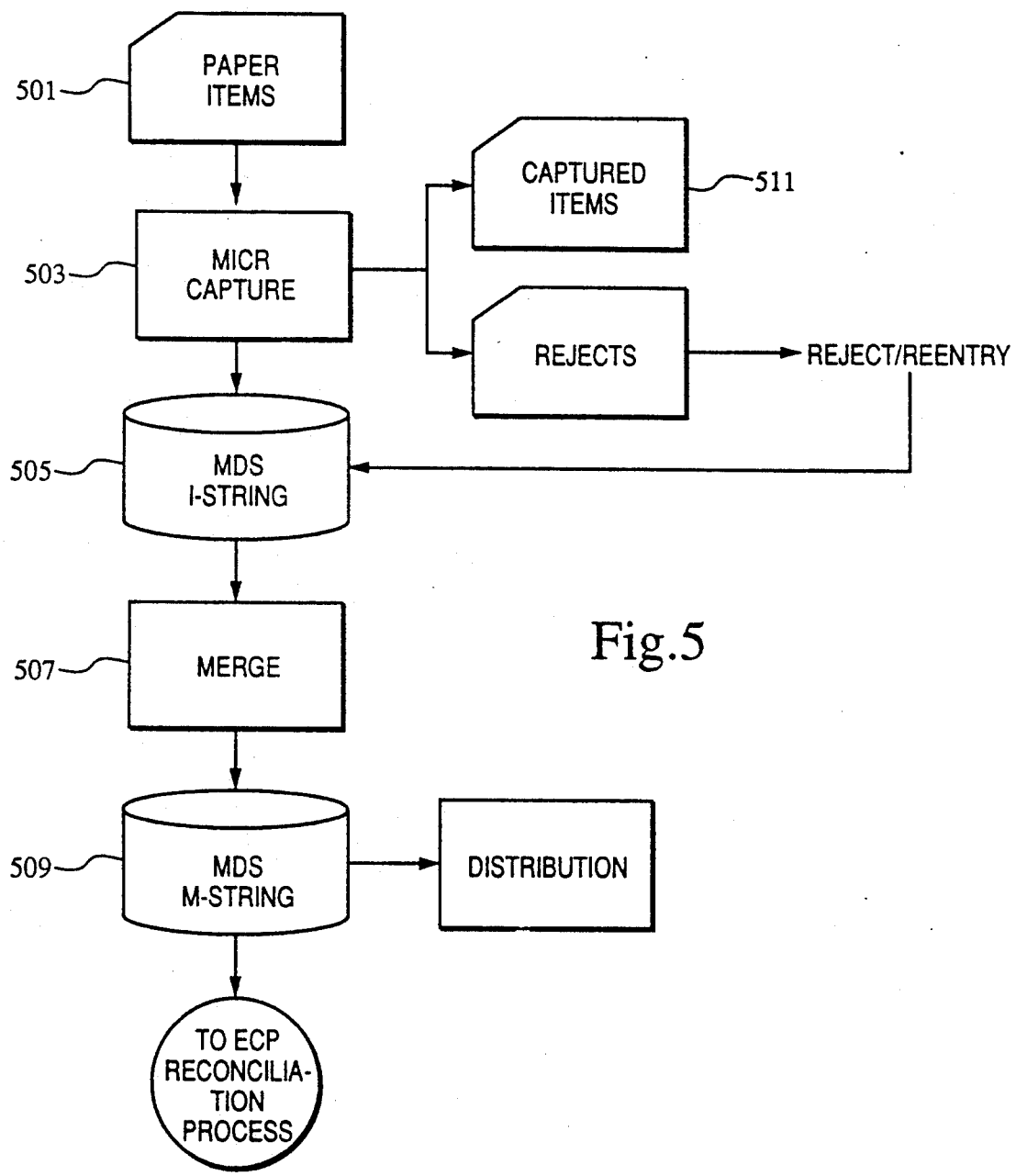
FIG. 5 is a schematic block representation of a first paper sorting in the receive sub-system.

Referring now to FIG. 5, after the paper cash letter is received, it is sorted in a conventional manner, without modification, by the CPCS of the partner bank in what is termed the first paper sort. Paper items 501, the checks, are unbundled and fed throughout the MICR capture and sort system 503. The capture of the paper cash letter produces a MDS I-String file 505, which is then merged at step 507 into an MDS M-string file 509 that will be used as an input into a reconciliation sort module. Captured items 511 are gathered, as they will be used in a second paper pass (see FIG. 7). Items rejected 513 in the MICR capture are reentered manually into the I-String file 505. All captured paper items are assigned a third item sequence number by the CPCS.

Figure 6:
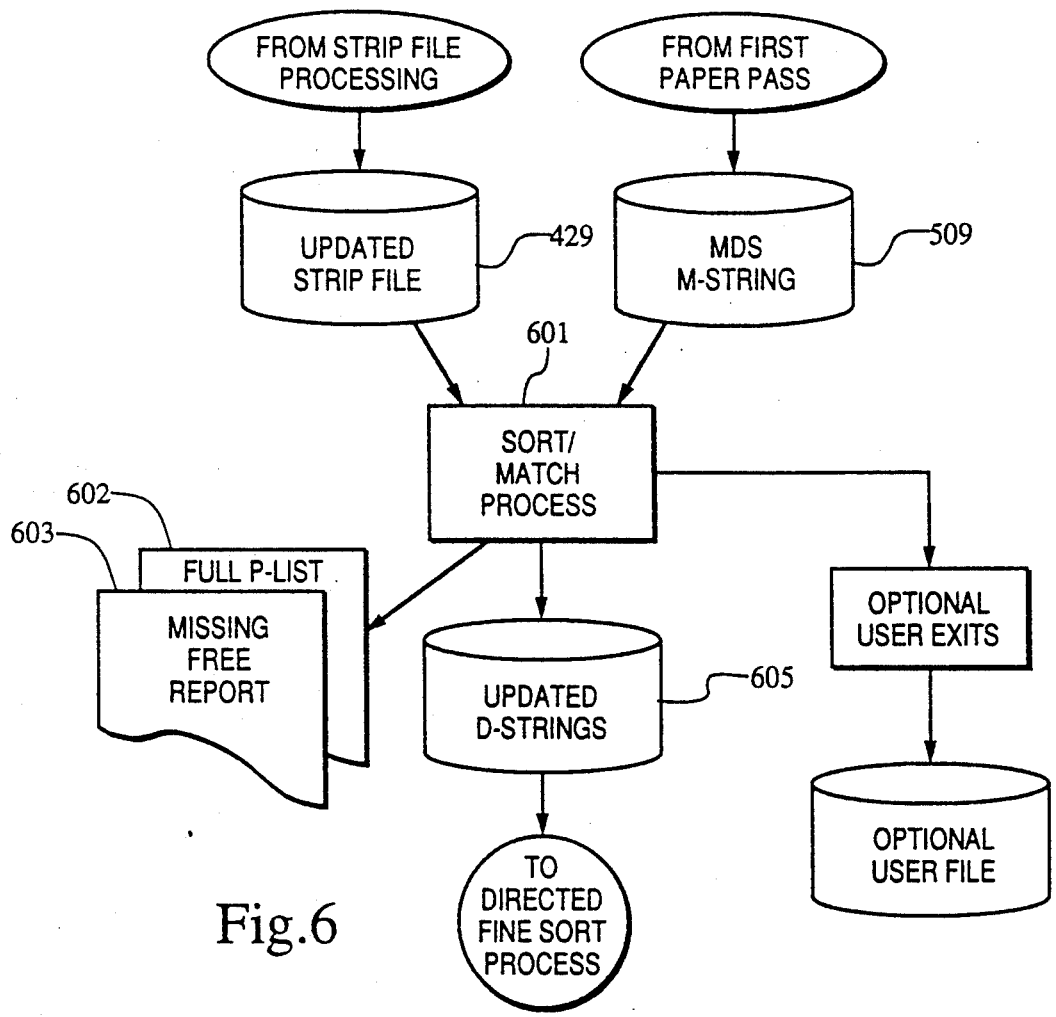
FIG. 6 is a schematic block representation of an ECP reconcilement process within the electronic check presentment system.

Referring now to FIG. 6, after the first pass, the paper items are reconciled with the electronic items received the previous day by electronically matching the two data files in the sort/match module 601. The sort/match module sorts through the ECP strip file 429 in order to match ECP strip file with the MDS M-String file 509 and merge the pocket codes from the strip file into the M-string file to produce a MDS D-String file 605. It then produces a full report 602 in account number and item sequence number sequence, and additionally produces a missing item/free item report 603. A missing/free report 603 details any missing paper items for which there was an electronic item, and any extra paper items for which there is not a corresponding electronic item.

Figure 7:
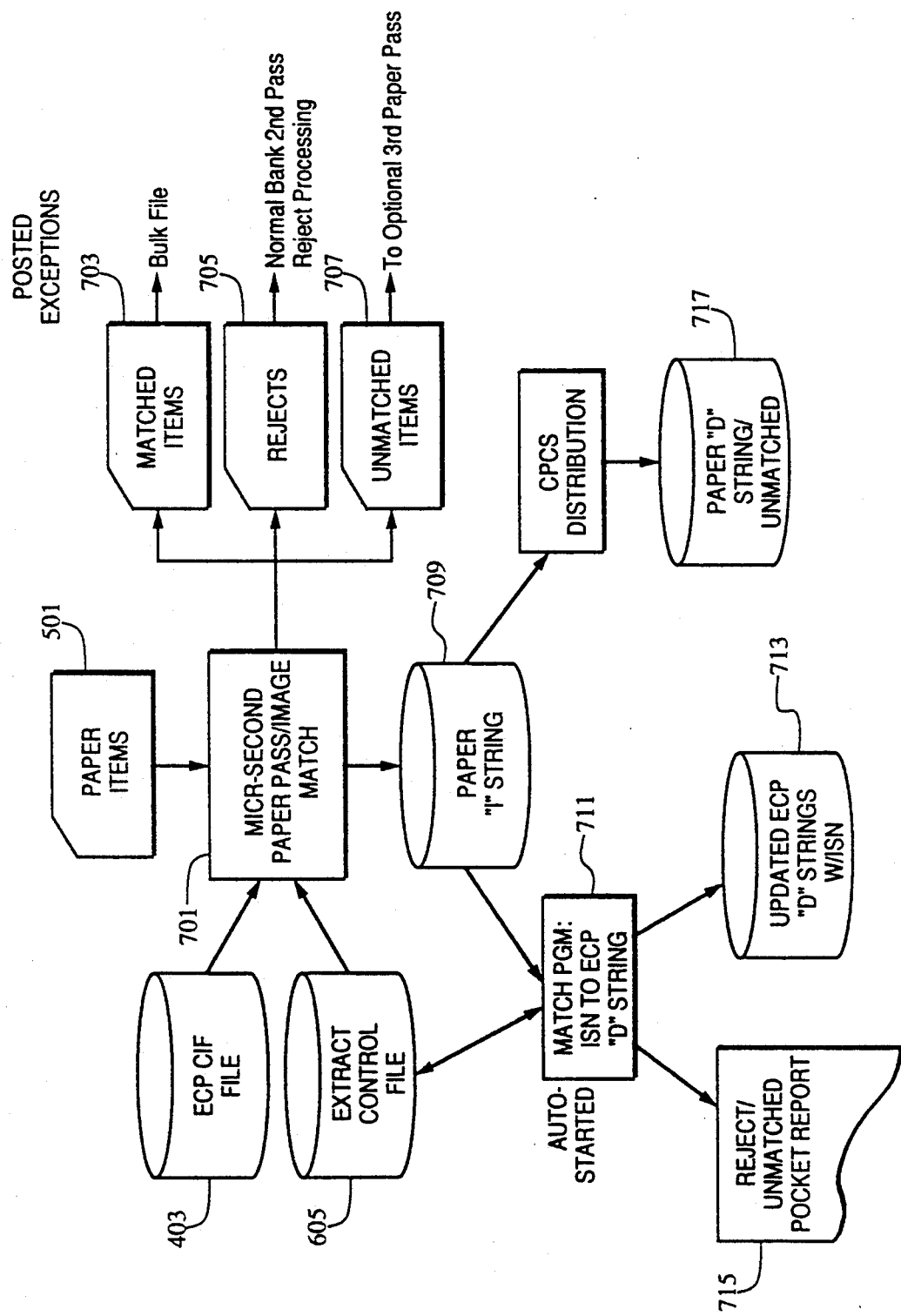
FIG. 7 is a block schematic representation of a second paper pass directed fine sort operation of the receive sub-system.
Figure 9:
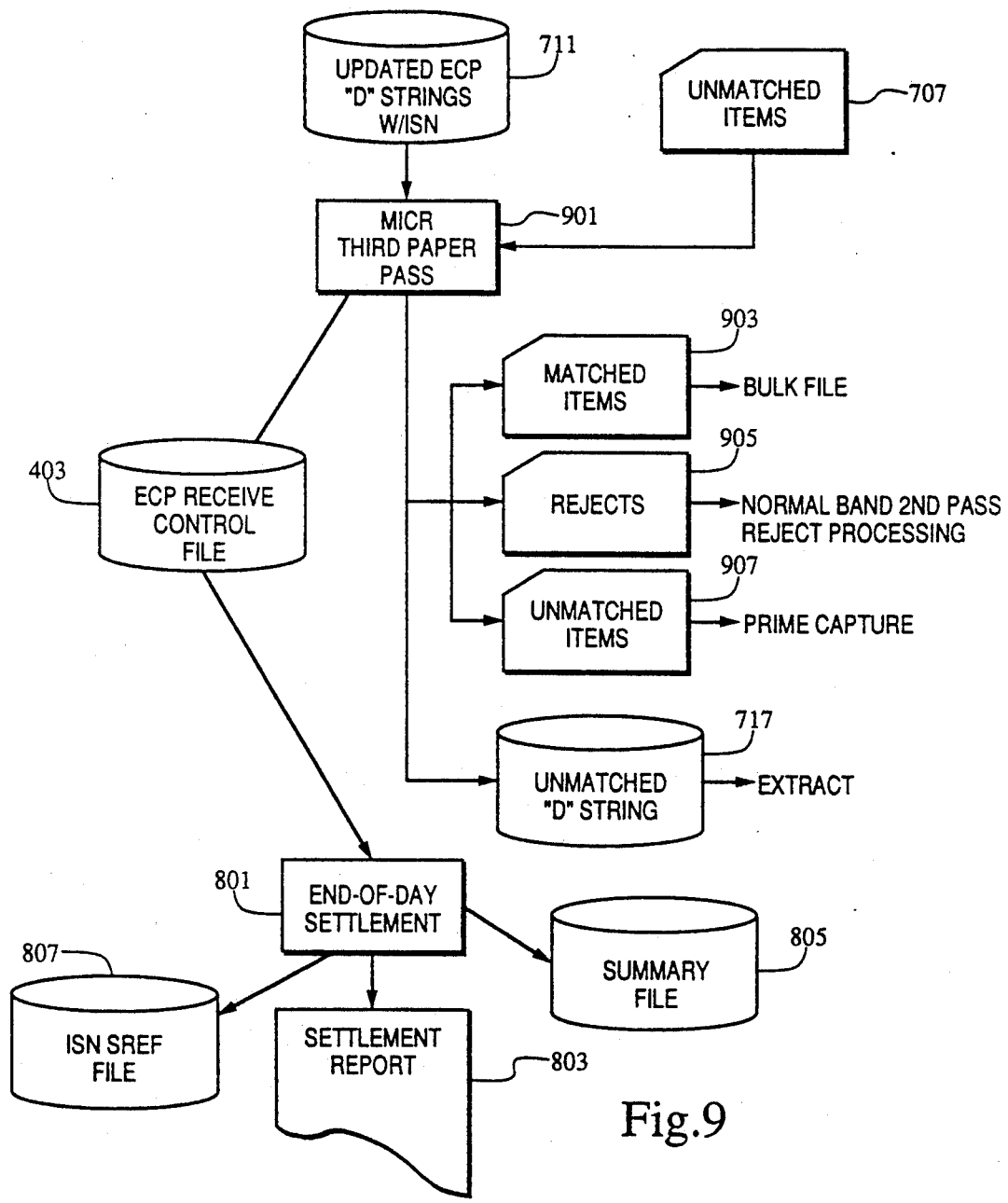
FIG. 9 is a block schematic representation of a third paper pass directed fine sort operation of the receive sub-system.

Referring now to FIG. 7, the paper items 501 are once again passed through the CPCS system for pocketing the paper items. A directed fine sort module 701 matches the image of the electronic item in the D-String file 605 with the actual paper item as it is re-read by the electronic sorter, and directs the paper item to the appropriate pocket as dictated by the pocket code in the D-String file 605, and is further described below. The directed fine sort module assumes that a pocket code is present for each item in the electronic cash letter D-string. Thus, only paper items for which the corresponding electronic cash letter images have completed DDA processing are able to be directed to a pocket by the directed fine sort; all other unmatched items are considered free, or extra items and are directed to an unmatched pocket. Additionally, to facilitate matching of the paper items to the electronic items, the D-String file 605 is utilized, since these records are in the same physical sequence as the actual paper items from the first paper pass.

The updated D-string file (containing the new pocket codes) directs the fine sort module, which in turn directs the sorter (not shown), to place matched paper items 703 to a pocket. The matched posted items are pocketed by statement cycle, the matched exception items are pocketed by exception code, the physical rejected items are sent to a reject pocket, and the unmatched (free) items are sent to an unmatched pocket. All rejected items 705 are fully reprocessed until only the actual unmatched items remain. These items are then batched and re-captured on the electronic sorter along with all of the bank's other first time capture work. The matched items are transferred to bulk file vaults or exception processing as appropriate.

The directed fine sort module expects that the D-String file 605 be in the same physical sequence as the paper items after the first paper pass. If the paper items are accidently dropped, or otherwise become out of sequence between the first and the directed fine sort-/second paper pass, an optional third paper pass is then provided to read the paper items in their current order, to re-order the D-String file 605 to match the new paper sequence, and then perform the directed fine sort.

Figure 8:
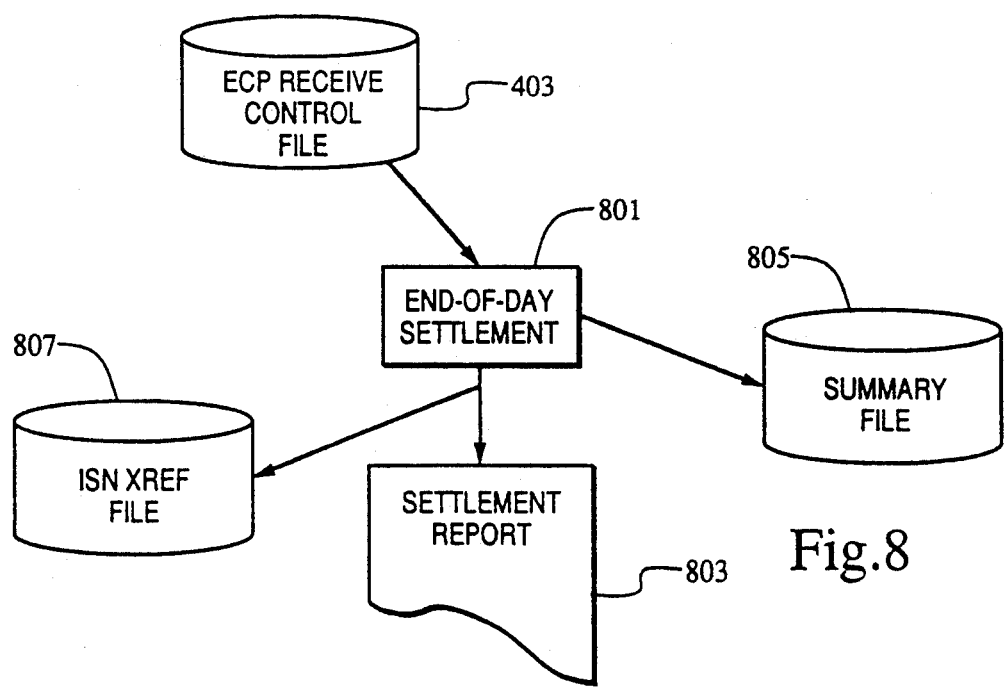
FIG. 8 is a block schematic representation of an end-of-day settlement function in the receive subsystem.

Referring now to FIG. 8, an end-of-day settlement module 801 reads the ECP receive control file 417 and produces an end of day or week or month settlement report 803 by bank, for all electronic cash letters received and processed through the electronic check presentment system. Additionally, an item sequences cross reference report is produced, listing the three item sequence numbers associated with each item: the Sending Bank ISN, the Electronic ISN, and the paper ISN. Optionally, an item sequence cross reference file can also be produced, for interface to various other look-up and retrieval systems.

The above described system has shown to provide an improved electronic check presentment system that allows all banks that utilize this system to electronically transfer and receive check information, reconcile this information against actual paper check processes, and manage information associated with electronic check presentment such as cash letter, bundle and file totals, unmatched records/paper and benefit sharing amounts.

The above described arrangement is merely illustrative of the principles of the present invention. Numerous modifications and adaptations thereof will be readily apparent to those skilled in the art without departing from the spirit and scope of the present invention as set forth in the appended claims.

What is claimed is:

1. A check presentment system for use by a bank within an organization of banks to improve clearing of checks presented between partner banks within the organization, the system comprising:
   means for capturing check information from paper checks collected by a presenting bank and storing the information in a first database;
   customer information file means for maintaining in a central file records on each partner bank participating in an electronic check clearing organization, the records including fields for storing an endpoint identification, and parameters relating to electronic check clearing;
   data processing means responsive to the customer information file means, the data processing means extracting from the first database check information for check items to be presented to a selected partner bank in response to an endpoint identification of the selected partner bank and forming an electronic cash letter data file means, including check information, summary balances and information for identifying the particular cash letter; and
   electronic means for transmitting the electronic cash letter to a partner bank for presentment of check items by means of the check information in the electronic cash letter.

2. The check presentment system of claim 1 further comprising:
   electronic means for receiving an electronic cash letter transmitted from a partner bank;
   data preprocessing means responsive to the customer information file means for validating the partner bank, the data preprocessing means further balancing the electronic cash letter and formatting the electronic cash letter for providing check information to the means for capturing check information; and
   data processing means for reconciling check information received from the partner bank in the electronic cash letter against check information received in a paper cash letter sent by the partner bank that corresponds to the electronic cash letter.

3. The check presentment system of claim 2 further comprising data processing means for controlling and maintaining records related to the transfer and receipt of the electronic cash letters.

4. The check presentment system of claim 1 wherein the data processing means forms the electronic cash letter with a field that indicates whether the check item is a return notice item.

5. The check presentment system of claim 1 wherein the data processing means forms the electronic cash letter with a control record that indicates whether a check item is a returned check item.

6. The check presentment system of claim 1 wherein the data processing means extracts killed items from a plurality of kill bundles; and wherein the electronic cash letter further includes a summary information for each kill bundle.

7. The check presentment system of claim 1 wherein the records on each partner bank include field for dates and time information relating to presentment of electronic cash letters between the presenting bank and each partner bank.

8. A check presentment system for use by a bank within an organization of banks to improve clearing of checks presented between partner banks within the organization while utilizing preexisting check processing systems, the system comprising:
   a check processing and capture system (CPCS), the CPCS including:
      means for magnetic ink charter recognition (MICR) for capturing check information from paper checks deposited by customers and received from a partner bank;
      data processing means for processing check information, the CPCS being modified to receive electronic check information; and
      mass data storage file means in which the captured check information is stored;
   data processing means for electronic check presentment, the data processing means including:
      file means for maintaining records on partner banks, the records including data identifying partner banks and parameters for electronic check presentment;
      send module means for extracting from the CPCS mass data storage file check information for transmission to a partner bank using identifying parameters from the file means, the send module formatting extracted check information according to a predefined format to form an electronic cash letter; and
      receive module means for preprocessing an electronic cash letter received from a presenting bank in order to provide for validation and balancing of the electronic cash letter, the receive module means providing the check information in the electronic cash letter to the CPCS for processing; and
   electronic communication means, coupled to the data processing means, for sending to and receiving from partner banks electronic cash letters.

9. The check presentment system of claim 8 wherein the send module means further provides for generating expected benefits report.

10. The check presentment system of claim 8 wherein the receive module means further reconciles an electronic cash letter received from a presenting bank with a corresponding paper cash letter received from the presenting bank.

11. The check presentment system of claim 8 wherein the receive module means further generates an item sequence number cross reference file for cross referencing a first item sequence number assigned to each electronic check item when an electronic cash letter is captured by the CPCS with a second item sequence number assigned to a corresponding paper check item during subsequent capturing of the paper cash letter.

12. An electronic check presentment system for managing, sending and receiving check information in the form of cash letters to and from banking systems, the system comprising:

means for selecting check information for extraction from a designed database containing said check information wherein the selection specific comprises a specific bank or endpoint and a cash letter time;

means responsive to said selecting means for extracting said selected check information in the form of electronic cash letters;

means for transmitting and receiving said electronic cash letters to and from other computer databases handling such check information;

means for reconciling the transmitted electronic cash letters against captured paper cash letters, wherein the reconciliation is accomplished by comparing the electronic cash letters against captured paper cash letters to determine discrepancies, and reporting any discrepancies to the electronic check presentment system; and means for controlling and maintaining records related to the transfer and receipt of said electronic cash letters, such information comprising routing transit numbers of the banks utilizing the electronic check presentment system, and dates and times related to specific transfers of electronic cash letters.

13. The electronic check presentment system of claim 12 further comprising:

means for reporting summary information related to the transfer of electronic cash letters, such information comprising the number of checks contained in specific bundles, the total dollar amounts associated with specific cash letters and bundles, the total dollar amount associated with the transfer of electronic cash letters to and from specific end points, and the dates and times associated with the transfers of specific electronic cash letters.

14. A method for managing, sending and receiving check information in the form of electronic cash letters to and from banking systems, the method comprising the steps of:

capturing paper cash letters in electronic cash letter form and storing them in a computer database;

selecting specific banks or endpoints that are to receive electronic cash letters, the selected banks or endpoints being provided by an on-line computer database that provides information on banks utilizing this method such as the names, addresses, phone numbers, routing transit numbers and contacts associated with selected banks;

extracting from said database those cash letters associated with said selected banks;

transmitting to said selected banks the extracted cash letters;

receiving electronic cash letters from transmitting banks and storing them in a computer database; and reconciling said electronic cash letters against captured paper cash letters.

15. The method for managing, sending and receiving check information in the form of electronic cash letters of claim 14 including the additional step of reformatting the extracted cash letters into a predetermined format prior to transmission to the selected banks.

16. The method for managing, sending and receiving check information in the form of electronic cash letters of claim 11 wherein the step of reconciling the electronic cash letters against captured paper cash letters is accomplished by comparing the electronic cash letters against captured paper cash letters to determine discrepancies, and reporting said discrepancies to a computer system responsible for said reconciliation.

17. A method for use by a bank in an organization of banks to reduce the time for payment on checks collected by it and presented to a bank within the organization for payment, the method comprising the steps of:

maintaining an information file for partner banks in an organization of banks, the information file on partner banks including maintaining data identifying the banks and benefit sharing parameters;

capturing check information from paper checks collected at the bank and storing the check information in a first database as check records;

selecting an endpoint bank from the information file;

extracting from the first database check records for the selected bank;

formatting according to predetermined format the extracted check records into an electronic cash letter for transmission to the selected bank.

18. The method of claim 17 wherein the step of maintaining an information file further includes the step of maintaining data on communications parameters.

19. The method of claim 17 wherein the step of selecting includes the step of building from the information file end-points from which to select killed bundles for extraction.

20. A method for use by a bank in an organization of banks to reduce the time for payment on checks collected by it and presented to a bank within the organization for payment, the method comprising the steps of:

maintaining an information file for partner banks in an organization of banks;

capturing check information from paper checks collected at the bank and storing the check information in a first database as check records:

selecting an endpoint bank from the information file;

extracting from the first database check records for the selected bank;

formatting the extracted check records into an electronic cash letter for transmission to the selected bank;

wherein the step of selecting includes the step of selecting from the information file a bank; and wherein the step of extracting further includes reading from a second database storing kill bundle information with which to extract check records from the first database for transmission to endpoints automatically selected from the information file.

21. The method of claim 17 wherein the step of formatting includes formatting the records according to a predetermined format.

22. The method of claim 21 wherein the step of formatting further includes the step of determining which check records are available for benefit sharing.

23. The method of claim 17 further including the step of generating a settlement report, including expected benefit sharing.

24. A method of processing an electronic cash letter received from a bank for expedited clearing of checks, the method comprising the steps of:

receiving an electronic cash letter file from a sending bank containing check records;

preprocessing the electronic cash letter file, the step of preprocessing including the steps of validating the electronic cash letter, checking for duplicate check items, balancing dollar amounts, and formatting for conforming to check processing and capture system (CPCS);

capturing the electronic check records with a CPCS;

posting the check records to a demand deposit accounting system;

capturing check information from paper checks in a subsequently received paper cash letter corresponding to the electronic cash letter; and reconciling the check records in the electronic cash letter with the captured check information and sorting the paper checks according to DDA cycles assigned during the capturing of the electronic check records.

25. The method of claim 24 further comprising the steps of:

assigning item sequence numbers during the capturing of the electronic check records and the capturing of the paper checks; and creating a cross reference file of the item sequence numbers for each check item.

26. A check presentment system for use by a bank without an organization of banks to improve clearing of checks presented between partner banks within the organization, the system comprising:

means for capturing check information from paper checks collected by a presenting bank and storing the information in a first database;

customer information file means for maintaining records identifying partner banks participating in an electronic check clearing organization and parameters relating to electronic check clearing;

data processing means responsive to the customer information file means, the data processing means extracting from the first database check information for check items to be presented to a selected partner bank and forming an electronic cash letter data file means, including check information and summary balances; the data processing means generating expected benefit reporting; and electronic means for transmitting the electronic cash letter to a partner bank for presentment of check items by means of the check information in the electronic cash letter.

27. A method on a data processing system for use by a bank in an organization of banks to reduce the time for payment on checks collected by it and presented to a bank within the organization for payment, the method comprising the steps of:

extracting bank item records from a first database storing item information captured from paper items collected at the bank to be presented to a selected endpoint;

maintaining a file on the data processing system on item records extracted; and formating the extracted item records into an electronic cash letter file for transmission to the selected endpoint, the electronic cash letter including item records and summary information on the item records.

28. The method of claim 27 wherein the step of maintaining a file on item records extracted includes storing sequence numbers for items extracted.

29. The method of claim 27 wherein the step of extracting includes extracting a plurality of kill bundles and wherein the step of formatting includes placing kill bundle control records in the electronic cash letter file.

30. The method of claim 27 further comprising the step of maintaining an information file on partner banks.

31. The method of claim 27 wherein the step of formatting includes associating data fields with item records in the electronic cash letter indicating whether the item record is eligible for return.

32. The method of claim 27 further comprising the step of maintaining an information file on banks within the organization of banks, the information including parameters relating to transmission of electronic cash letters to each bank.

33. A method on a data processing system for use by a bank in an organization of banks to reduce the time for payment on checks collected by it and presented to a bank within the organization for payment, the method comprising the steps of:

receiving an electronic cash letter file from a sending bank containing electronic check records;

maintaining an electronic control file containing information on check records received in the electronic cash letter and subsequent processing of the check records;

communicating the electronic check records in the electronic cash letter file to a posting system;

passing the paper checks subsequently received within a paper cash letter corresponding to the electronic check records within an electronic cash letter through a check capture system and capturing paper check records and placing them in an electronic file; and reconciling by comparing the check records in the electronic cash letter file with the paper check records captured from paper checks, placed in the electronic file.

34. The method of claim 33 wherein the step of reconciling includes the steps of:

updating with a data processing system electronic check records received in the electronic cash letter with posting information;

comparing with a data processing system the electronic check records with the paper check records placed in the electronic file;

updating with a data processing system matched check records with posting information and ordering matched or unmatched check record files in an order in which the paper checks were captured; and passing the paper checks through a sorter in the same order of the original passing of the paper checks through the check capture system and sorting the paper checks into pockets according to the posting information associated with the matched check records.

35. The method according to claim 34 wherein the step of sorting further includes the step of sorting checks into separate pockets according to whether the checks are identified as matched or unmatched.

36. The method of claim 33 further comprising the step of preprocessing the electronic cash letter file, the step of preprocessing including the steps of validating the check items within the electronic cash letter for posting and checking for duplicate cash letters.

37. The method of claim 33 wherein the step of preprocessing further includes balancing the electronic cash letter.

38. The method of claim 33 wherein the step of communicating the electronic check records to a posting system includes capturing electronic check records with a paperless input to a check capture system prior to posting.

39. A method on a data processing system for use by a bank in an organization of banks to reduce the time for payment on checks collected by it and presented to a bank within the organization for payment, the method comprising the steps of:

selecting an endpoint for presentment of items for payment;

extracting check records to be presented to the selected endpoint from a first database storing item information captured from paper items collected at the bank;

maintaining a file on the check records extracted;

formatting the extracted check records into an electronic cash letter of electronic check records for transmission to the selected endpoint;

receiving an electronic cash letter file from a sending bank containing electronic check records;

posting electronic check records in the electronic cash letter file;

reconciling with the data processing system the check records in the electronic cash letter file with check information captured from paper checks in a subsequently received paper cash letter corresponding to the electronic cash letter; and maintaining a control file means on the data processing system responsive to the steps of extracting check records and receiving electronic cash letters, the control file means keeping track of check records sent and received.

40. A method of reconciling an electronic cash letter that has been posted with a subsequently received paper cash letter comprising the steps of:

updating with a data processing system electronic check records received in the electronic cash letter with posting information;

passing a paper cash letter through a check capture system and capturing check records;

matching with a data processing system the electronic check records with the paper check records;

updating with a data processing system matched check records with posting information and ordering matched and unmatched check record files in an order in which the paper checks were captured; and passing the paper checks through a sorter in the order they first passed through the check capture system and sorting the paper checks into pockets according to the posting information associated with the matched check records.

41. A check presentment system for use by a bank within an organization of banks to improve clearing of checks presented between partner banks within the organization, the system comprising:

electronic means for receiving an electronic cash letter transmitted from a partner bank;

data preprocessing means for validating the partner bank, the data preprocessing means further balancing the electronic cash letter and formatting the electronic cash letter for providing check information to a means for capturing check information; and data processing means for reconciling check information received from the partner bank in the electronic cash letter against check information received in a paper cash letter sent by the partner bank that corresponds to the electronic cash letter.

42. The check presentment system of claim 41 further comprising data processing means for controlling and maintaining records related to the receipt of the electronic cash letters.

43. The check presentment system of claim 41 wherein the system further includes a means for capturing check information, the means for capturing check information receiving a paper cash letter and capturing check records; wherein the data processing means for reconciling updates electronic check records received in the electronic cash letter with posting information, matches the electronic check records with the paper check records, updates matched check records with posting information and orders matched and unmatched check record files in an order in which the paper checks were captured; and wherein the system further includes a sorter for receiving the paper checks through a sorter in the order they first passed through the means for capturing checks and for sorting the paper checks into pockets according to the posting information associated with the matched check records.

44. A method on a data processing system for use by a bank to reduce the time for payment on checks collected by it and presented to a partner bank or payment, the method comprising the steps of:

maintaining a central information file on a data processing system, the central information file containing information particular to each partner bank with whom the bank engages in presenting checks electronically, the information including routing and transit numbers of each bank and formats of electronic cash letters preferred by the partner bank;

extracting with the data processing system, in response to a routing and transit number of a selected bank, bank item records from a database storing item records captured from paper items collected at the bank to be presented to the selected bank; and formatting with the data processing system, in response to the information on formatting, the extracted item records into an electronic cash letter file for transmission to the selected bank in an electronic cash letter format preferred by the selected bank, the electronic cash letter including item records and summary information on the item records.

45. The method of claim 44 wherein the central information file includes information on any deadlines for presenting electronic cash letters to each partner bank and wherein the data processing system prompts extracting of bank item records for a partner bank in response to deadlines for that partner bank.

46. The method of claim 44 wherein the central information file includes information on profit/benefit sharing between the bank and each of its partner banks for presentment of bank item records electronically in an electronic cash letter; and wherein the data processing system reports the expected benefits from presentment of an electronic cash letter based on the profit/benefit sharing information in the central information file.

* * * * *